Sept. 22, 1953     D. W. SHERMAN     2,653,057
WELDED PRESSED STEEL DUAL WHEEL
Filed Sept. 6, 1947     2 Sheets-Sheet 2
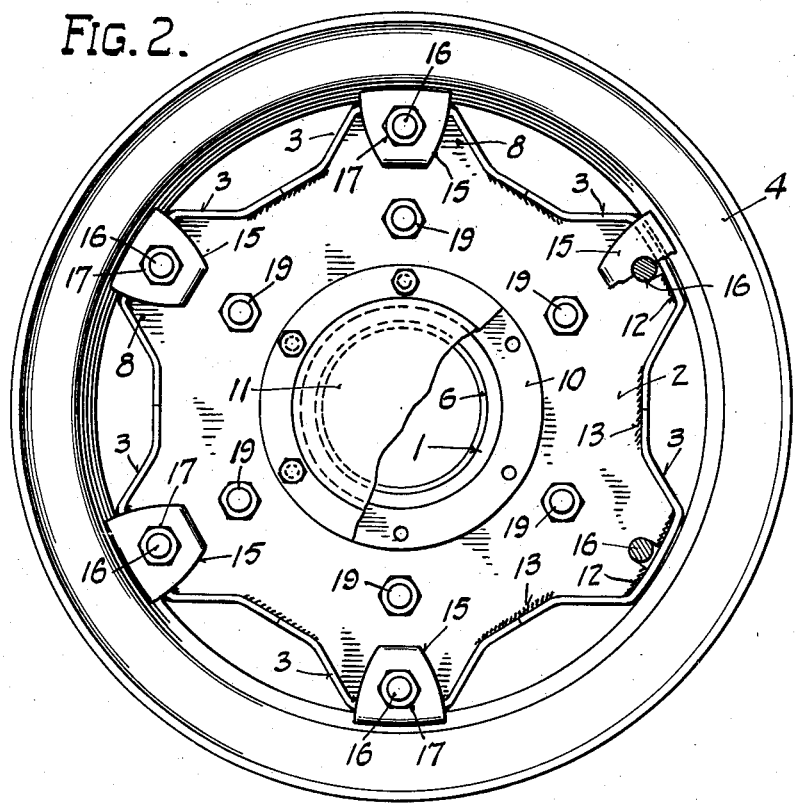
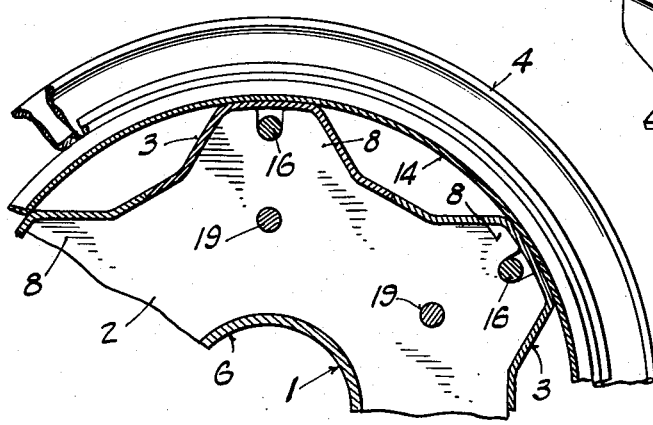
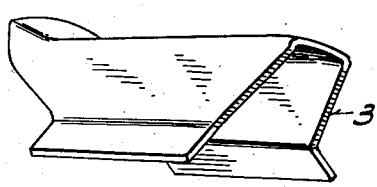
Donald W. Sherman
INVENTOR.
BY
ATTORNEY.

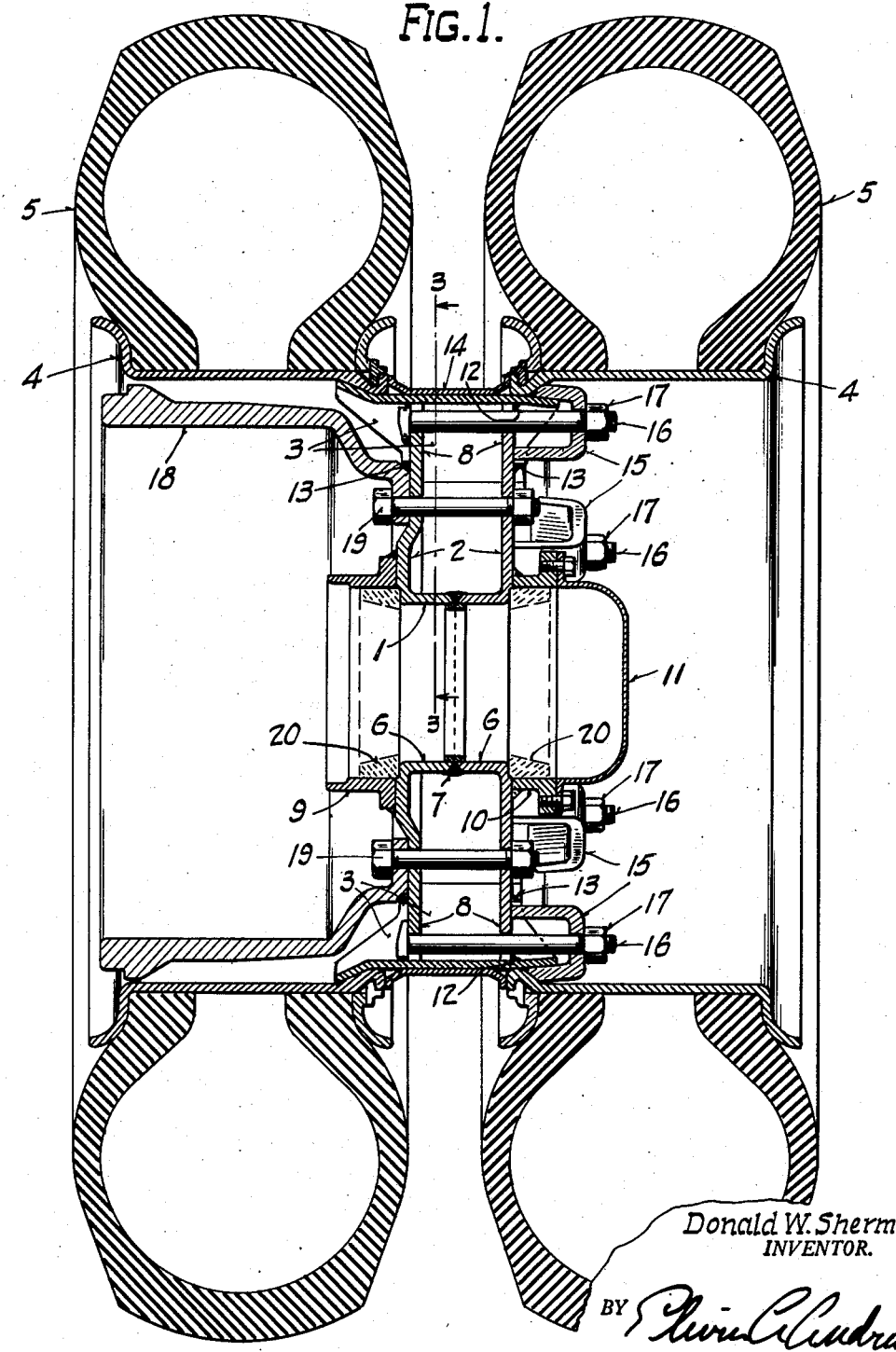

Patented Sept. 22, 1953

2,653,057

UNITED STATES PATENT OFFICE 2,653,057

WELDED PRESSED STEEL DUAL WHEEL

Donald W. Sherman, Milwaukee, Wis., assignor to A. O. Smith Corporation, Milwaukee, Wis., a corporation of New York Application September 6, 1947, Serial No. 772,522

5 Claims. (Cl. 301—13)

This invention relates to a pressed and welded steel dual wheel for heavy duty work on trucks and trailers.

One type of dual wheel on trucks and trailers in use at present is of cast metal. The cast wheels are made of either malleable iron or cast iron with the hub integral with the disc or spokes. The tires and rims are demountable so that for tire changing, only the tire and rim are removed.

Another type of dual wheel on trucks and trailers is made up of two solid standard rims welded to a pair of pressed steel discs which are attached to a cast or forged metal hub by special studs and nuts. For tire changes, one or both complete disc, rim, and tire assembly is removed as is done on a passenger car.

The principal object of the invention is to provide a welded, pressed steel one-piece dual wheel of generally light weight but capable of withstanding heavy duty in service.

Another object of the invention is to provide a welded, pressed and stamped steel dual wheel in which machining is substantially eliminated.

A further object of the invention is to provide a welded, pressed steel dual wheel in which the hub is fabricated at decreased cost.

Another object is to provide a welded, pressed steel dual wheel in which the tires may be removed readily without removal of any part of the wheel.

These and other objects of the invention will appear hereinafter in connection with the following description of the drawings illustrating an embodiment of the invention.

In the drawings:

Figure 1 is a longitudinal sectional view of the dual wheel of the invention with parts in elevation;

Fig. 2 is an end elevational view looking from the right side in Fig. 1 with parts broken away and sectioned;

Fig. 3 is a section taken on line 3—3 of Fig. 1; and

Fig. 4 is a perspective view of one of the spokes which support the tire rims.

Referring to the drawings, there is shown a dual wheel comprising in general a hub 1 and a pair of radially spaced hexagonal shaped discs 2 which extend from the hub and support spokes 3 for receiving the rims 4 and tires 5, as will be described.

The inner portion of each disc 2 has an inwardly turned cylindrical flange 6 and the ends of flanges 6 are joined together by the circumferential weld 7 to provide the flanges of the discs as the body portion of hub 1. The outer periphery of each disc is formed hexagonally to provide a plurality of projections 8 lying on the same circumferential line.

The inner end of hub 1 comprises the flanged ring or tubular member 9 and the outer end of the hub is formed by the flanged ring or tubular member 10. The flange of end ring 9 is welded to the inner disc 2 while the non-flanged end of end ring 10 is welded to the outer disc 2. The flange of ring 10 receives the hub cap 11 which is bolted thereto.

Flanged rings 9 and 10 are extruded from flat plate and thereby provided at low cost.

Spokes 3 comprise a plurality of generally channel shaped members which are shaped to fit the hexagonal shaped edges of discs 2. The rim receiving portion of each spoke 3 is of conical shape on the outer end, and is flared on the inner end to retain rims 4 when they are clamped into place, as will be described. The rim receiving portion of each spoke extends axially outwardly from the discs a substantial distance while that portion of spokes 3 lying between the hexagonal projections of the discs has approximately the same width as the discs and the distance the discs are spaced from each other to fit over the discs and close them off.

The side flanges of spokes 3 abut between the hexaxgonal projections 8 of discs 2. Welds 12 are disposed under spokes 3 and against the sides of discs 2 to secure spokes 3 to the hexagonal projections of the discs. The welds 13 secure the spokes to the discs between the projections 8 thereof and lie across the longitudinal joint between each spoke and against the side of the discs.

Discs 2 are blanked and stamped and then shaved to eliminate machining and spokes 3 are all stamped by the same set of tools to make them substantially identical within certain tolerance limits. Due to this method of providing the discs and spokes, when welds 12 and 13 are made, machining of spokes 3 to center the same with respect to the center of the wheel is eliminated. Rims 4 are then accurately centered on spokes 3 relative to the center of the wheel.

Spokes 3 support the inner and outer rims 4 which are spaced from each other by spacer 14 lying on spokes 3 around the circumference of the wheel.

The inner rim 4 is assembled against the flared inner portion of spokes 3, and spacer 14 rests against the outside of inner rim 4 and the inside of the outer rim 4. The rims are held in place by a plurality of lugs 15 which are shaped to engage outer rim 4 and outer disc 2. The lower flange of each lug 15 rests against outer disc 2 while the upper flange slips over the conical flange or outer end of each spoke 3 and into engagement with outer rim 4. The lugs are secured by bolts 16 which extend through both of the discs 2, and are tightened into place by nuts 17. The bolts thus have a bearing on both of discs 2 to clamp the rims in place and force the inner rim against the flared inner periphery of spokes 3.

The structure shown is completed by the brake drum 18 which is bolted to both of discs 2 by a plurality of bolts and nuts 19.

In forming the dual wheel of the invention discs 2 are blanked to hexagonal shape and each is provided on the inner circumference with flange 6 as well as with slots for bolts 16 and bolt holes for bolts 19. The discs are then joined by welding flanges 6 together. This closes the inner periphery of the discs to form the central body of hub 1 while the outer ends and body portion of the discs are spaced from each other and the structure is open.

Flanged rings 9 and 10 are then formed from flat plate by extruding the same and forming the flanges thereon. The flange of ring 9 is then welded to the inner disc 2 and the non-flanged end of ring 10 is welded to the outer disc 2. The rings are horizontally aligned when in place adjacent the hub portion of discs 2 to complete the hub of the wheel and are slightly radially removed from that portion of the hub formed by flanges 6 to provide seats for the bearing races 20.

The spokes 3 are stamped and formed to fit the hexagonal shape of discs 2 and are welded to the discs by welds 12 and 13 as previously described to receive rims 4 carrying tires 5. The brake drum 18 is bolted to discs 2 and the hub cap 11 is bolted to the flange of ring 10 to complete the wheel assembly.

In removing the rims 4 with tires 5 from the wheel, nuts 17 on bolts 16 are unthreaded and lugs 15 are removed. Outer rim 4 may then be slipped off, spacer 14 is removed and inner rim 4 is then pulled off over the spokes 3 forming the outer circumferential portion of the wheel.

The invention provides a generally light weight welded pressed metal wheel in which the outer bearing surface for supporting the rims is accurately centered relative to the center of the wheel without expensive machining operations.

In addition, the hub is formed from the two discs and extruded end rings welded to the sides of the discs to provide a light weight low cost hub of substantial strength.

Various embodiments of the invention may be employed within the scope of the accompanying claims.

I claim:

1. In a welded pressed dual wheel assembly for trucks and trailers and the like, a pair of pressed metal discs formed complementary to each other with said discs being axially spaced apart for the greater portions thereof, an inwardly directed flange formed on each disc at the inner end thereof with the flange of one disc butt welded to the flange of the other disc to provide a hub section of the wheel assembly and each disc having an irregular complementary periphery at the outer circumference to provide an interrupted circular supporting surface, and a plurality of complementary pressed metal members welded to the outer periphery of said discs and extending along the entire periphery of the discs to close the outer circumference of the wheel and provide a bearing surface for tire rims for accurately centering the same with respect to the center of the wheel without machining.

2. A welded pressed dual wheel assembly for trucks and trailers and the like, a pair of pressed metal discs formed complementary to each other with said discs being axially spaced apart for the greater portion thereof and joined together at the inner end with an inwardly directed flange on one disc butt welded to a corresponding flange on the other disc to provide the body of the hub of the wheel and each disc having an irregular complementary periphery at the outer circumference to provide an interrupted circular supporting surface, a plurality of complementary pressed metal members welded to the outer periphery of said discs and extending along the entire periphery of the discs to close the outer circumference of the wheel and provide a bearing surface for tire rims for accurately centering the same with respect to the center of the wheel without machining, and extruded tubular members with extruded flanges thereon welded to said discs adjacent the hub portion thereof to complete the hub of said wheel.

3. In a welded pressed dual wheel assembly having a hub with a pair of complementary formed discs axially spaced radially outwardly of flanged inner end portions with the flanges of the discs joined together to form a portion of said hub and providing a circular bearing surface at the outer periphery by a plurality of interrupted projections, and a plurality of generally transverse complementary pressed metal members overlying the projections on said discs and welded to the discs along said projections and between said projections to provide a supporting surface for receiving tire rims to accurately center the same relative to the center of the wheel.

4. In a welded pressed dual wheel assembly for trucks and trailers and the like, a pair of pressed metal discs formed complementary to each other with said discs being axially spaced apart for the greater portion of their radial extent with means joining the inner end portions of the discs together, and said discs having an irregular complementary periphery at the outer circumference to provide an interrupted circular supporting surface, and a plurality of complementary pressed metal members welded to the outer periphery of said discs and extending along the entire periphery of the discs to close the outer circumference of the wheel and provide a bearing surface for the tire rims for accurately centering the same with respect to the center of the wheel without machining.

5. In a welded pressed dual wheel assembly for trucks and trailers and the like, a pair of pressed metal discs formed complementary to each other with said discs being axially spaced apart for the greater portions thereof and with an inwardly directed flange on the inner end portion of one disc butt welded to a corresponding flange on the inner end portion of the other disc to provide the body portion of the hub of said wheel, an extruded tubular member welded at the inner end to each of said discs adjacent the hub portion thereof and providing inner circumferential bearing surfaces extending over a substantial distance axially from both sides of the body portion of the hub in substantially axial alignment with said disc flanges to complete the hub of said wheel, and one of said tubular members having a radially outwardly extending flange on the outer end thereof for attachment of a hub cap to said flange.

DONALD W. SHERMAN.

References Cited in the file of this patent

UNITED STATES PATENTS

| Number | Name | Date |
|---|---|---|
| 468,843 | St. John | Feb. 16, 1892 |
| 1,303,235 | Benson | May 13, 1919 |
| 1,489,384 | Church | Apr. 8, 1924 |
| 1,492,416 | Beeman | Apr. 29, 1924 |
| 1,525,436 | Beeman II | Feb. 10, 1925 |
| 1,586,425 | Goodyear | May 25, 1926 |
| 1,860,001 | Vanderveer | May 24, 1932 |
| 2,355,941 | Ash | Aug. 15, 1944 |
| 2,427,378 | Ash | Sept. 16, 1947 |
| 2,491,150 | Ash | Dec. 13, 1949 |

FOREIGN PATENTS

| Number | Country | Date |
|---|---|---|
| 22,060 | Great Britain | 1897 |